July 8, 1952 W. BURKART 2,602,670
FEED SPREADER
Filed March 4, 1950 2 SHEETS—SHEET 1
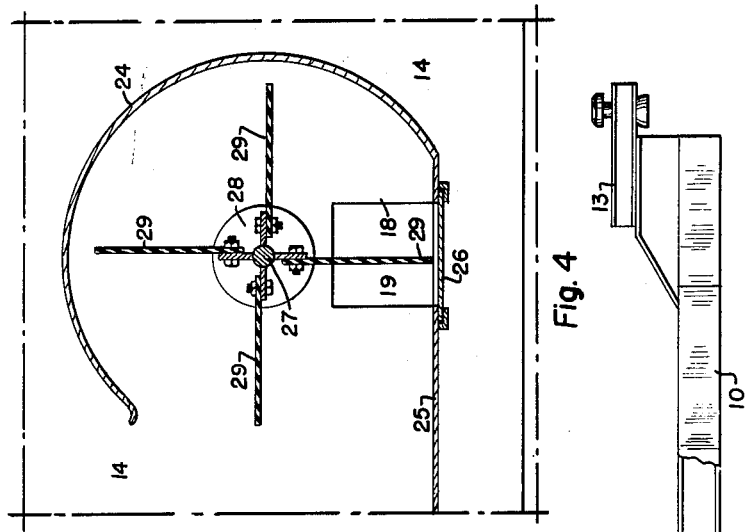
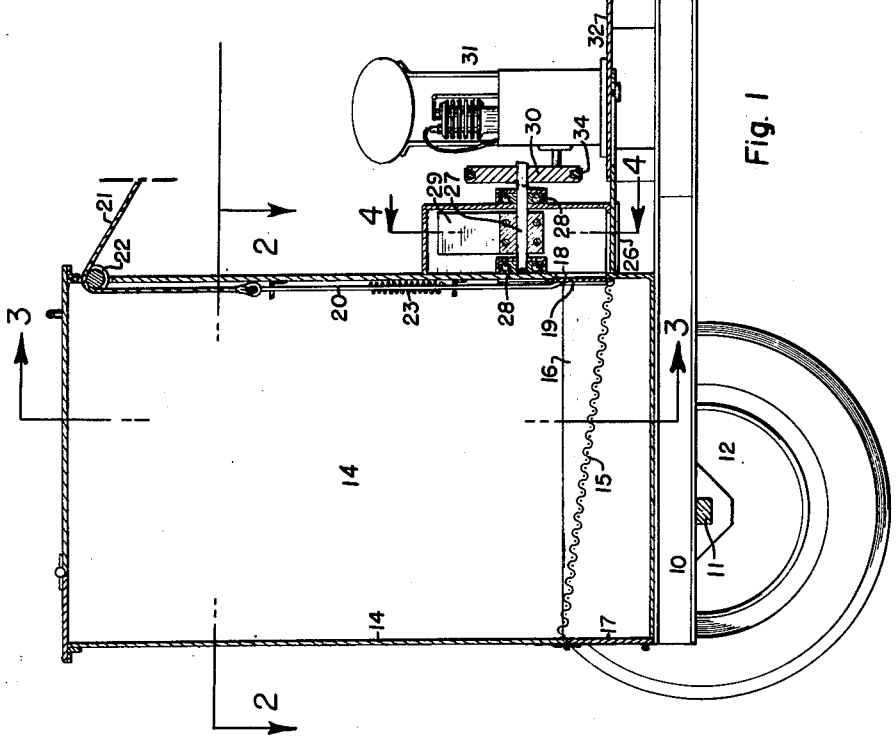
INVENTOR.
WILLIAM BURKART
BY
ATTORNEY July 8, 1952 W. BURKART 2,602,670
FEED SPREADER Filed March 4, 1950 2 SHEETS—SHEET 2

INVENTOR.
WILLIAM BURKART
BY
ATTORNEY

Patented July 8, 1952

2,602,670

UNITED STATES PATENT OFFICE 2,602,670

FEED SPREADER

William Burkart, Denver, Colo.

Application March 4, 1950, Serial No. 147,705

1 Claim. (Cl. 275—8)

This invention relates to means and facilities for distributing stock food in the form of prepared pellets on and over ground areas and into position where it is available for consumption by livestock, and has as an object to provide an improved powered unit operable to advantageously effect such distribution of the feed.

A further object of the invention is to provide an improved translatable unit operable to distribute prepared feed for consumption by livestock in pasture or field.

A further object of the invention is to provide improved powered means in association with a translatable unit and operable to effectively distribute prepared stock feed with a minimum of damage thereto.

A further object of the invention is to provide an improved powered feed spreader susceptible of practical development as a trailer unit.

A further object of the invention is to provide an improved powered feed spreader characterized by simple and efficient means for regulating the feed output therefrom.

A further object of the invention is to provide an improved powered feed spreader characterized by means for conserving otherwise wasted fines.

A further object of the invention is to provide an improved powered feed spreader that is simple and inexpensive of construction from readily-available materials, that is positive, efficient, and economical of operation, that is adaptable to practical embodiment in a variety of particular capacities and operative mountings, and free from onerous maintenance and repair requirements.

With the foregoing and other objects in view, my invention consists in the construction, arrangement, and combination of elements hereinafter set forth, pointed out in my claim, and illustrated by the accompanying drawings, in which—

Figure 2:
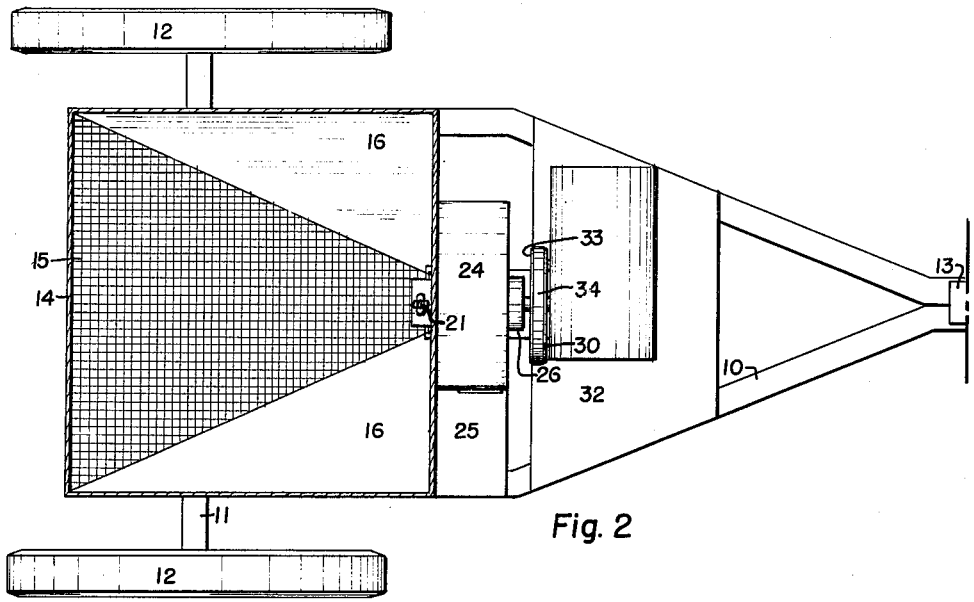
Figure 3:
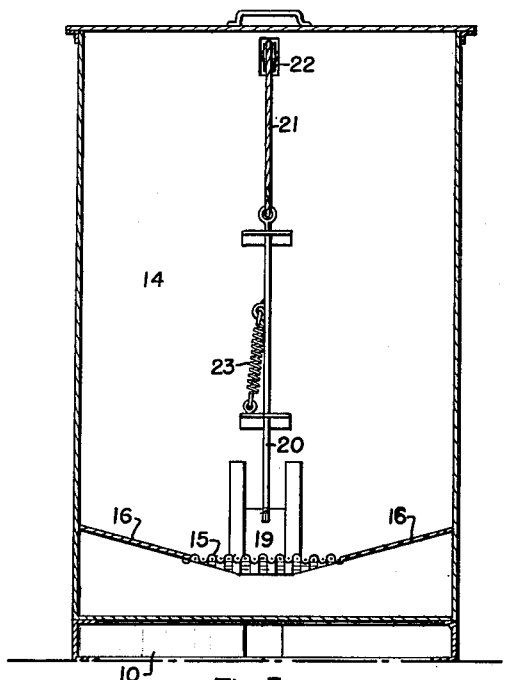

Figure 1 is a side elevation, largely in vertical section, of a preferred embodiment of the invention as constructed and arranged ready for practical use. Figure 2 is a plan, partly in section, taken substantially on the indicated line 2—2 of Figure 1. Figure 3 is a transverse section taken substantially on the indicated line 3—3 of Figure 1. Figure 4 is a fragmentary, detail section, on an enlarged scale, taken substantially on the indicated line 4—4 of Figure 1.

While, as will be apparent, the spreader unit of the instant invention is susceptible of development in various forms and styles, some of which may be adapted for translation with and on trucks, wagons, and the like, the preferred embodiment illustrated and hereinafter described is arranged to operate as a wheeled trailer connectible for translation with any appropriate vehicle, such as a truck.

As shown, a flat, rigid frame 10, of any appropriate construction, is operatively engaged adjacent one of its ends with and for support by an axle 11 whereof the ends projecting laterally beyond the frame sides mount wheels 12 independently rotatable in spaced parallelism for translation of the frame; said frame 10 preferably converging in plan away from the axle 11 to mount a hitch member 13, connectible in a usual manner with a complementary member on a towing vehicle, at its end remote from the axle 11 and on the longitudinal median line of the assembly. Manifestly, the frame, axle, wheels and hitch of the trailer unit are so proportioned and interrelated as to dispose said frame in substantially horizontal attitude when hitch-connected with a towing vehicle by means of the member 13 and rollably supported for translation on the ground-engaged wheels 12, and the trailer unit so constituted is but representative of various means for the support and operative correlation of the elements hereinafter described in a manner facilitating their ready translation and use.

Fixed to, substantially covering, and upstanding above the end of the frame 10 carried by the axle 11, a preferably rectangular hopper 14, of sheet metal or equivalent material, is characterized by a horizontal, imperforate bottom member, side walls, imperforate save as hereinafter specified, perpendicularly upstanding from margins of said bottom member, and a handled, hinged-panel top closure wherethrough feed material may be charged within the hopper. Coextensive in width with the rearward, or trailing, side wall of the hopper 14 and secured thereto along a line parallel with and above the adjacent hopper bottom margin, a flat sheet 15 of foraminous or reticulate material inclines forwardly and downwardly of the hopper to fixedly close against the leading, or forward, hopper wall in a maintained, but reduced, spacing with the hopper bottom, and side margins of said sheet 15 converge forwardly from the rearward hopper corners to delimit a sheet forward margin of reduced width engaged with and centrally of the hopper forward wall. Triangular sheets 16, of imperforate material, fill the spaces between the sheet 15 convergent sides and the adjacent hopper walls in appropriate inclination downwardly and inwardly of the hopper from horizontal lines of hopper wall attachment corresponding in elevation with that of the sheet 15 rear margin and to closing relation against the sheet 15 convergent sides, so that said sheets 15 and 16 constitute a gravity-feed floor in the hopper moderately above the hopper closed bottom and effective to feed the hopper charge toward a central, lower area of the hopper forward wall; the reticulate or foraminous nature of the sheet 15 functioning to screen fines from the hopper charge and into the space between said floor and the hopper bottom where they are collected and retained for occasional removal through a hinged door 17 provided in the hopper rear wall between said floor and bottom rear margins.

Substantially coextensive in width with the sheet 15 forward margin, and rising thereabove, a feed aperture 18 intersects the hopper 14 forward wall in cooperation with a flat plate gate 19 reciprocable in guides on the inner face of said hopper forward wall into and out of closing relation therewith. A stem 20 fixed at its lower end to an upper margin of the gate 19 reciprocably engages through guides on the inner face of the hopper forward wall and connects at its upper end with a pull cord 21 which is led over a pulley 22 in and adjacent the hopper forward wall upper end to a point within convenient reach of the towing vehicle operator and is there available to determine upward shift of the gate 19 relative to the aperture 18; a retractile spring 23 engaging between the stem 20 and one of the stem guides to normally and yieldably urge said stem and the associated gate 19 into closing relation of the latter with and across the aperture 18.

Fixed to the outer face of the hopper 14 forward wall, a generally cylindrical housing 24, of moderate axial dimension, is disposed with an approximately tangential portion 25 of its wall horizontal and transverse of the hopper wall at the lower margin of the aperture 18 in position to receive delivery from the hopper through said aperture; said housing portion 25 extending across the aperture 18 and the hopper wall at one side thereof to the hopper wall edge and cooperating with an edge of the housing cylindrical wall upwardly spaced in overhanging relation therewith to define an ejection throat opening laterally of the hopper just above the frame 10. An opening in the housing portion 25 registered with and extending forwardly from the aperture 18 is furnished with marginal guides disposed to position and reciprocably mount a slide 26 selectively shiftable longitudinally of the assembly into and out of closing relation with said opening, so that, said slide being closed over the opening, feed delivered through the aperture 18 collects within the housing 24 and upon the inner span of the housing portion 25, while forward shift of said slide into clearing relation with the associated opening permits feed delivered through the aperture 18 to drop through the housing portion 25 for deposit as a windrow upon the ground and between the wheel 12 paths of assembly translation. It is frequently desirable to spread the feed material thinly over a relatively extensive area, as distinguished from the windrowing thereof, for which purpose a fan-type impeller is mounted for power rotation within the housing 24 in an arrangement effective to eject feed incoming to said housing through the aperture 18 laterally and outwardly of the assembly along and above the housing portion 25 when the slide 26 is shifted to close the opening through said portion 25. As illustrated, the power-rotatable impeller comprises a shaft 27 journaled for rotation axially of the housing 24 above the aperture 18 in suitable bearings 28 carried by the hopper 14 forward wall and the housing forward end closure to project at one end forwardly and longitudinally of the assembly beyond the housing, non-rigid blades 29 of appropriate size detachably secured at their inner ends to, in a uniform angular spacing about, and to extend radially from the shaft 27 portion traversing the housing for end-sweeping coaction with the housing portion 25 adjacent the aperture as an incident of shaft 27 rotation, and a drive pulley 30 fixed to the shaft 27 and projecting forwardly from the housing. A source of power, such as an internal combustion engine 31, is mounted on the frame 10, or on a deck 32 suitably fixed to said frame, with a pulley 33 on its power output shaft coplanar with the pulley 30 and in driving relation with the latter through a belt 34, whereby to reflect engine 31 operation as rotation of the impeller assembly at a speed suitably proportioned to that of the engine and in a direction effective to eject feed material outwardly through the open throat of the housing 24 above the housing portion 25. As will be manifest, the engine 31 in driving relation with the impeller assembly is merely typical of any expedient means for power rotation of said assembly, it being within the contemplation of the invention that a power drive from the towing vehicle may be applied to effect impeller rotation through means and in a manner commonly employed for the powering of accessory equipment, or, alternatively, that rotational travel of one or the other of the wheels 12 may be applied to effect such impeller drive by means and techniques old in the related art.

The non-rigid character of the impeller blades 29 is of practical importance in the application of the improved apparatus to its primary purpose of spreading prepared stock feed since the impact of the rotating blades against the feed material, usually in the form of ground fines compressed into pellets, would tend to pulverize and waste the feed in a form unavailable to livestock were the said blades unyieldably rigid. Suitable for non-destructive ejection of the feed material, impeller blades 29 of leather, rubber, belting, fabric, and analogous compositions, exhibit long life and effective performance.

Practical use and operation of the improvement are clearly readable from the foregoing disclosure, translation of the unit in towed relation with a vehicle functioning to screen the hopper charge of its fines in a manner permitting recovery thereof for subsequent feeding in troughs, boxes, and mangers and simultaneously urging the charge to and through the aperture 18 as sized for regulation of the feed outflow through selective adjustment of gate 19 elevation. With the impeller rotating under drive from the engine 31 and the slide 26 shifted to close the drop opening in the housing portion 25, the feed delivered through the aperture 18 is ejected and spread laterally of the assembly and along the travel path thereof, while with the impeller at rest and the slide 26 adjusted to uncover the drop opening, the feed delivery from the hopper is deposited as a windrow marking the assembly travel path.

Since changes, variations, and modifications in the form, construction, and arrangement of the elements shown and described may be had without departing from the spirit of my invention, I wish to be understood as being limited solely by the scope of the appended claim, rather than by any details of the illustrative showing and foregoing description.

I claim as my invention—

A feed spreader comprising a hopper wheel-supported for translation and including an imperforate bottom member, a discharge aperture centrally of and intersecting the hopper front wall transverse to the direction of translation with the aperture lower margin spaced upwardly from said bottom member, an inclined floor in said hopper cooperating with the aperture lower margin for the direction of hopper contents to and through the aperture and cooperating with said bottom member to define a collecting chamber therebetween at the lower end of the hopper, an access door opening to said collecting chamber through the hopper rear wall, a perforated section in said floor for the diversion of hopper contents fines therethrough and to said collecting chamber, a reciprocable gate spring urged into closing relation with said aperture, means for manually shifting said gate against the pressure of its spring and into various uncovering relations with said aperture for the regulation of hopper contents discharge therethrough, a housing juxtaposed and closing against the front wall of said hopper about and in covering relation with said aperture and having a discharge opening at one side thereof through which material may be ejected transversely of the direction of hopper travel and a horizontal floor on the level with the lower margin of said aperture, and an impeller power-rotatable in said housing about an axis paralleling the direction of assembly translation and across said aperture for the ejection of hopper contents discharge through the housing side opening and laterally of the assembly.

WILLIAM BURKART.

REFERENCES CITED

The following references are of record in the file of this patent:

UNITED STATES PATENTS

| Number | Name | Date |
|---|---|---|
| 981,160 | Bickerstaff | Jan. 10, 1911 |
| 2,003,628 | Chadwick | June 4, 1935 |
| 2,430,020 | Johnson | Nov. 4, 1947 |
| 2,487,503 | Witter | Nov. 8, 1949 |
| 2,517,151 | Weston | Aug. 1, 1950 |

FOREIGN PATENTS

| Number | Country | Date |
|---|---|---|
| 597,224 | Great Britain | Jan. 21, 1948 |